(12) United States Patent
Mann et al.

(10) Patent No.: US 11,231,173 B2
(45) Date of Patent: *Jan. 25, 2022

(54) AUDIO SIGNAL DRIVEN ANALOG FLAME DISPLAY

(71) Applicant: TKIP HOLDINGS, LLC, Vancouver, WA (US)

(72) Inventors: William H. Mann, Vancouver, WA (US); Trent Farrer, Vancouver, WA (US)

(73) Assignee: TKIP HOLDINGS, LLC, Vancouver, WA (US)

( * ) Notice: Subject to any disclaimer, the term of this patent is extended or adjusted under 35 U.S.C. 154(b) by 117 days.

This patent is subject to a terminal disclaimer.

(21) Appl. No.: 16/005,325

(22) Filed: Jun. 11, 2018

(65) Prior Publication Data

US 2019/0242577 A1 Aug. 8, 2019

Related U.S. Application Data

(63) Continuation of application No. 15/971,551, filed on May 4, 2018, now abandoned.

(Continued)

(51) Int. Cl.
*F23N 1/00* (2006.01)
*F23D 14/28* (2006.01)
(Continued)

(52) U.S. Cl.
CPC ............. *F23N 1/002* (2013.01); *F23D 14/28* (2013.01); *F23D 14/465* (2013.01); *F23N 5/203* (2013.01);
(Continued)

(58) Field of Classification Search
CPC .. F23N 1/002; F23N 2023/38; F23N 2037/02; F23N 2041/11; F23N 5/203
See application file for complete search history.

(56) References Cited

U.S. PATENT DOCUMENTS 3,603,707 A 9/1971 Stantz
3,772,670 A 11/1973 Swithernbank et al.
(Continued)

FOREIGN PATENT DOCUMENTS

CN 202180025 U * 4/2012

OTHER PUBLICATIONS

"MOSFET vs. IGBT" Electronic Products, Oct. 3, 2011.www.electronicproducts.com/Analog_Mixed_Signal_ICs/Discrete_Power_Transistors/MOSFET_vs_IGBT.aspx.

*Primary Examiner* — Jorge A Pereiro
*Assistant Examiner* — Logan P Jones
(74) *Attorney, Agent, or Firm* — McCoy Russell LLP

(57) ABSTRACT

A "flame show" is responsive to an audio input signal such as music. A base unit including an analog base unit controller circuit is arranged to receive an audio input signal and generate an analog control signal that is responsive to the audio input signal. The analog control signal is distributed, by wire or wireless, to one or more flame display units such as a "tiki torch." Each flame display unit has a fuel source, and a proportional valve for controlling an amount of fuel supplied to a burner. Preferably, the control signal controls a gate terminal of a MOSFET semiconductor device, which in turn is coupled to control current in the proportional valve each each unit. By deploying multiple flame display units, all coupled to the same base unit, all of the flame display units contribute synchronously to the overall flame show.

9 Claims, 6 Drawing Sheets

Related U.S. Application Data

(60) Provisional application No. 62/501,604, filed on May 4, 2017.

(51) Int. Cl.
| | | |
|---|---|---|
| *F23D 14/46* | (2006.01) | |
| *F23N 5/26* | (2006.01) | |
| *G06F 3/16* | (2006.01) | |
| *F23N 5/20* | (2006.01) | |

(52) U.S. Cl.
CPC ............... *F23N 5/265* (2013.01); *G06F 3/16* (2013.01); *F23N 2223/38* (2020.01); *F23N 2235/16* (2020.01); *F23N 2235/24* (2020.01); *F23N 2237/02* (2020.01); *F23N 2241/11* (2020.01)

(56) References Cited

U.S. PATENT DOCUMENTS

| | | | |
|---|---|---|---|
| 3,999,933 | A | 12/1976 | Murphy |
| 4,242,078 | A * | 12/1980 | Nelson ...................... F23Q 9/14 431/45 |
| 4,648,381 | A | 3/1987 | Ishii et al. |
| 5,161,963 | A | 11/1992 | Berlincourt |
| 5,549,469 | A | 8/1996 | Wild et al. |
| 5,890,485 | A | 4/1999 | Shimek |
| 8,823,714 | B1 | 9/2014 | Thielvoldt |
| 2008/0206695 | A1 | 8/2008 | Ormond |
| 2010/0075264 | A1* | 3/2010 | Kaplan ..................... F23Q 3/00 431/42 |
| 2012/0258412 | A1* | 10/2012 | Jackow ................... F23D 14/60 431/254 |
| 2015/0047627 | A1* | 2/2015 | Thielvoldt .............. F23N 1/002 126/503 |

\* cited by examiner

AUDIO SIGNAL DRIVEN ANALOG FLAME DISPLAY

RELATED APPLICATION

This application is a continuation of U.S. patent application Ser. No. 15/971,551, filed May 4, 2018, which claims the benefit of U.S. Provisional Application No. 62/501,604, filed May 4, 2017, which is incorporated herein by this reference. Applicant claims priority under 35 USC § 119(e) based on said provisional application.

COPYRIGHT NOTICE

© 2017-2018 T K Products, LLC. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

BACKGROUND OF THE INVENTION

Fire is often used for decorative or entertainment effects, for example, in fire pits or theatrical displays. Sometimes, bursts of flame may be triggered in conjunction with music or other inputs. Examples are disclosed, for example, in U.S. Pat. Nos. 5,890,485; 6,413,079; and 8,823,714 (Thielvoldt). Thielvoldt's "Music-Reactive Fire Display" utilizes a digital signal processor programmed to analyze a music input signal and generate a "visualization signal" output to control a flame display responsive to the music. That type of system requires relatively expensive and complicated digital components and software. The need remains for simpler, less expensive, yet effective methods and circuits to control a fire display responsive to music, so that the music and fire display together form an attractive and compelling audio-visual experience. The disclosure that follows solves this and other problems.

SUMMARY OF THE INVENTION

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

In one aspect, a system according to invention may comprise:
a base unit including an analog base unit controller circuit arranged to receive an audio input signal and generate an analog control signal that is responsive to the audio input signal;
a control wire connectable to the base unit to distribute the analog control signal; and
a flame display unit electrically connectable to the control wire to receive the analog control signal;
the flame display unit including a combustible fuel source to generate an open flame;
and the flame display unit including a proportional valve to control flow of fuel from the fuel source so as to controllably vary a height of the open flame responsive to the analog control circuit during operation of the flame display unit.

In some embodiments, the flame display unit includes a flame control circuit arranged to receive the analog control signal and generate an analog valve position signal; and the flame control circuit is arranged to utilize the analog valve position signal to control electrical current in the proportional valve during operation, thereby producing an active flame show responsive to the audio input signal.

In one embodiment, the flame control circuit may be arranged to present a high impedance to the control wire while receiving the analog control signal so as to minimize loading the analog control signal. Multiple flame display units may each contain a corresponding flame control circuit, and all of the control circuits may be coupled to the common control wire to control their operation. In some embodiments, the control units may be electrically (mechanically) connected to a common control wire to receive the analog control signal. In other embodiments, the control signal may be distributed from a base unit using wireless (radio) technology. Many flame display units may be controlled by a single base unit.

In another aspect, a system may provide multiple flames during operation, each of them varying synchronously responsive to the analog control signal. The specific flame size, color, height, and magnitude of variations may vary across different flame display units within a system. For example, in one system, a given flame display unit may vary the flame dramatically in response to the analog input signal, while a smaller flame display unit may make more subtle changes, still synchronized to the common input signal.

In another aspect, a method comprises taking an audio input signal, full wave rectifying it, low-pass filter the signal to limit changes to the response characteristics of the gas valve. The slope of the filtered signal may be determined as positive (+/up) or negative (−/down). If up the valve is opened, if down the valve is closed. This up/down voltage may be combined with a DC offset voltage in a current summer circuit. This offset may be used to set the minimum valve drive current. In some embodiments, this voltage both sets a pilot light function and puts the valve is the maximum drive range.

Additional aspects and advantages of this invention will be apparent from the following detailed description of preferred embodiments, which proceeds with reference to the accompanying schematic diagram.

DETAILED DESCRIPTION OF PREFERRED EMBODIMENTS

Figure 1:
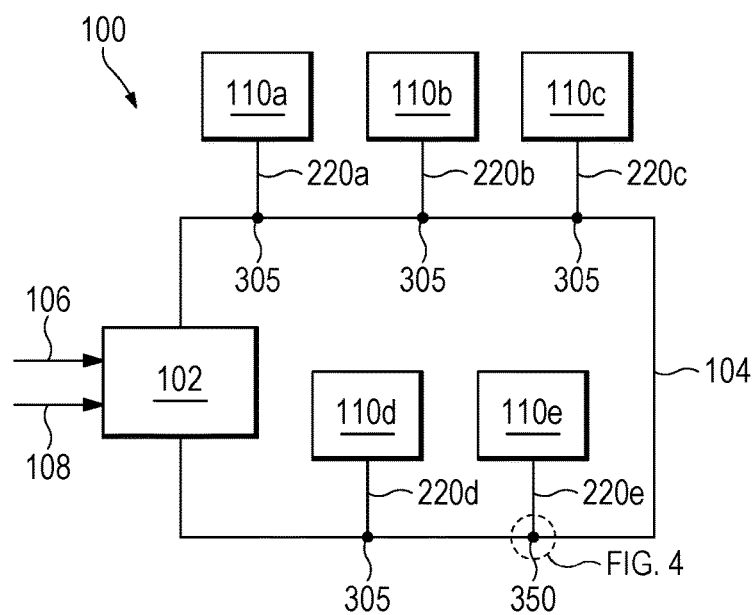
FIG. 1 is a simplified diagram of an example of an audio signal driven flame display system.

FIG. 1 is a simplified block diagram of an example of a system 100 to realize an audio input signal-driven flame display show. In this example, a base unit 102 may be used to control one or more separate flame display units, such as units 110a, 110b and 110e. The flame display units may be substantially identical, but they need not be so. Individual flame display units 110 may have different sizes, materials, flame characteristics, fuels, as well as mechanical designs, support or mounting systems, and/or decorative surface ornamentation. In some cases, one or more of the flame display units may be designed and decorated to resemble a "tiki torch," reminiscent of the bamboo torches historically used in tiki cultures. Each of the flame display units is connectable to a common flame display system control wire 104.

The base unit 102 may have an external power source (not shown) to provide power input at 106. The power requirements will depend on the specific design of the base unit 102. The base unit 102 may be tethered to a power source, or it may contain rechargeable batteries, for example, Nickel Cadmium (NiCad) battery, Nickel-Metal Hydride (NiMH) battery, Lead Acid battery, Lithium Ion battery, Lithium Polymer battery, etc. The power source preferably is a low-voltage DC source, for example, 12 volts.

Base unit 102 may incorporate an audio programming (content) source, such as a CD player, internet-connected browser for streaming, microphone, etc. In other embodiments, it may provide connections 108 to receive audio signals from external audio sources such as audio entertainment systems, smart phone, etc. The source of audio signals is not limited.

The base unit 102 contains a base unit controller circuit, described in more detail below. Briefly, the controller circuit in the base unit receives an audio input signal (from any source) and generates a control signal responsive to the audio input signal. The control signal is specially adapted for use in controlling flame displays in flame display units. The base unit applies the control signal to a control wire or cable 104, which in turn carries the control signal to all flame display units 110 that are coupled to the wire 104 to receive it. For outdoor use, for example, in a garden, the wire 104 should have a substantially weather-impermeable protective covering or coating (402 in FIG. 4). The wire 104 should have at least two electrical conductors (and may also have a separate ground or shield connection). In operation, the base unit provides the common control signal so that one or more flame display units connected to it via wire 104 can generate individual flame displays responsive to the same audio input signal in a synchronized manner. Each flame display unit may have a hookup wire 220a, 220b, etc. coupled to a connector 305 or 350 to connect the individual flame display unit to the common control wire 104. Such connections are described in more detail below with regard to FIG. 4.

Figure 2:
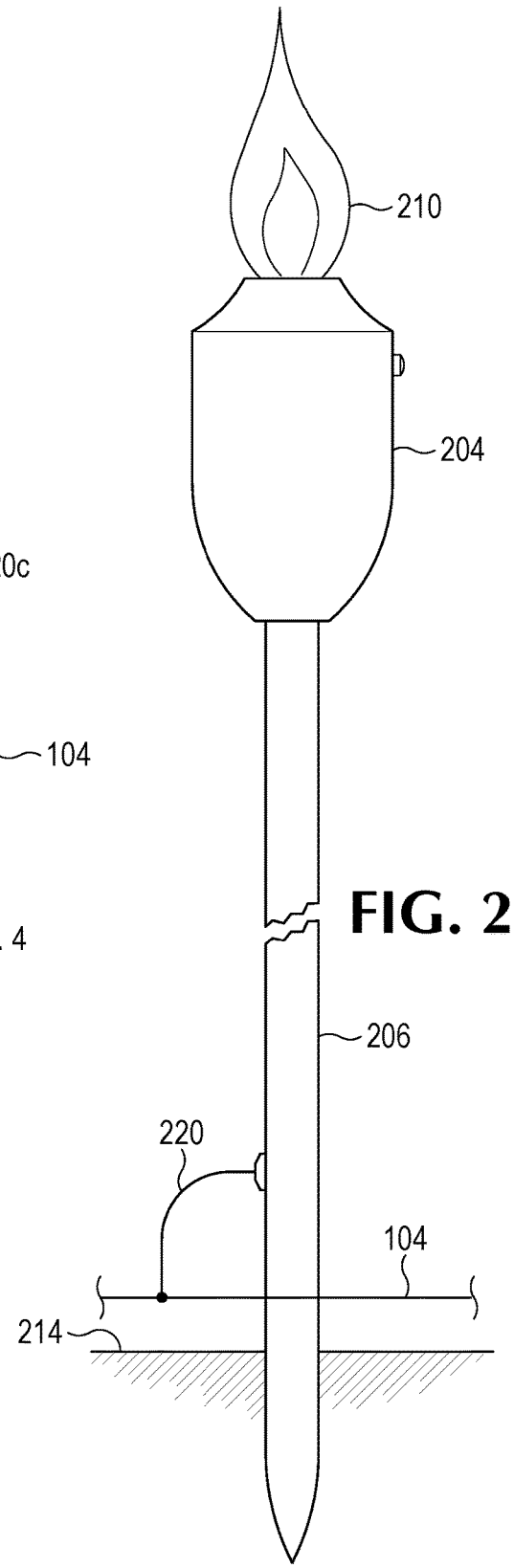
FIG. 2 is a simplified diagram of an example of a flame display unit compatible with a flame display system of the type illustrated in FIG. 1.

FIG. 2 is a conceptual diagram of an example flame display unit. The display unit illustrated may be used in the context the system of FIG. 1 as one of the flame display units 110a-110e. A flame display unit in one embodiment may comprise a rigid mounting pole 206 for temporarily planting the display unit into sod or grass 214 or the like. Alternatives may include a rigid base (not shown), arranged to support the display unit, for example, on a hard surface such as brick, pavers, or concrete flatwork. Various temporary or permanent mounting and support systems may be used. The design is not critical, it merely needs to provide sturdy support, so the flame display unit remains upright.

The flame display unit comprises a torch section 204 securely mountable to the supporting pole 206 to hold the torch section upright. An aperture may be provided in the pole or other support structure to accommodate a hookup wire 220 extending from the torch section 204 for connection to the common control wire 104 discussed above. Routing the hookup wire 220 internally of the support pole 206 is optional but preferred. In operation, the flame display unit 200 generates a flame 210 extending from the torch unit 204, wherein the flame size or height varies responsive to a control signal imposed on the wire 104 by the base unit 102 (FIG. 1).

Figure 3:
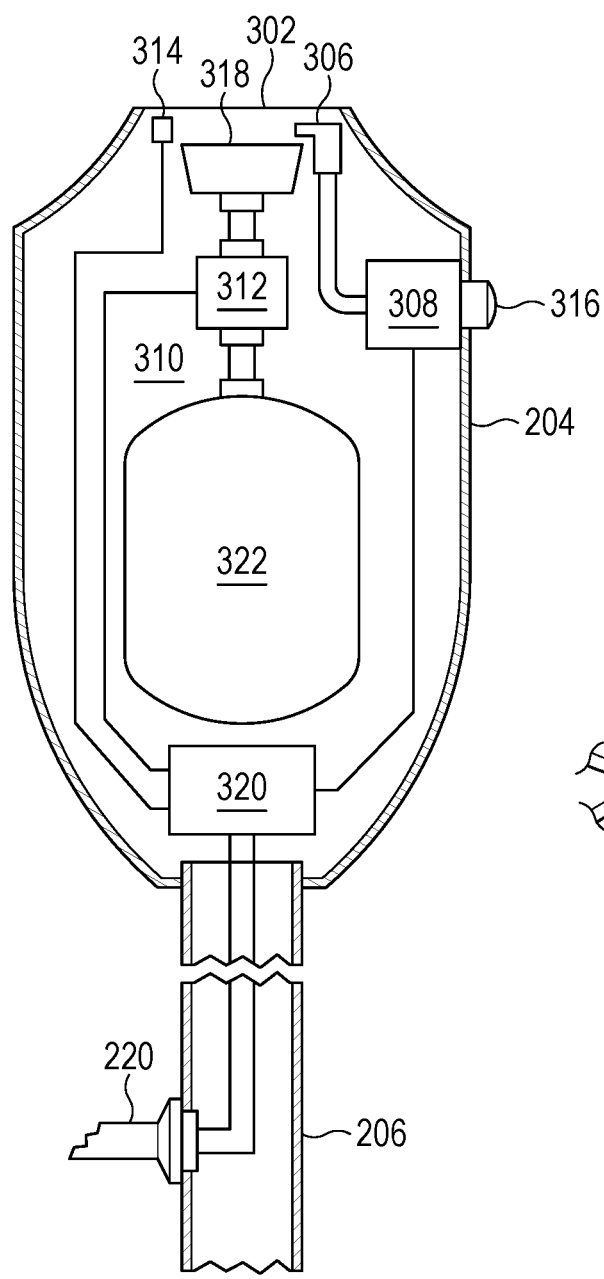
FIG. 3 is an enlarged diagram showing more detail of a flame display unit of the type illustrated in FIG. 2.

FIG. 3 shows an example flame display unit in more detail. Here, the flame display unit has a rigid housing 204, mountable to an upright support 206 (which may be integrally formed). The flame display unit contains a controller or control circuit 320 which may be connected via wire 220 to a base unit such as 102 in FIG. 1. A wireless alternative is described below with regard to FIG. 6. A fuel tank 322, preferably re-fillable, is provided in the flame display unit to provide fuel to generate the flame 210 during operation. The fuel tank 322 is coupled via valve 312 to a burner 318 where a variable flame is emitted through an open aperture in the top of the flame display unit during operation. The control circuit may provide multiple features. It may be coupled to a flame detection sensor 314, for example, a thermocouple. The control circuit may shut off the valve 312 when no flame is detected by sensor 314. During normal operation, the control circuit 320 controls the valve 312 to vary the fuel flow, and thus the flame height, responsive to an analog control signal, as described in more detail below. In some embodiments, the controller 320 may further be coupled to an igniter 308, positioned adjacent the burner 318, to ignite the flame to begin operation. In some embodiments, a button 316 may also be provided to enable manual actuation of the ignitor.

Figure 4:
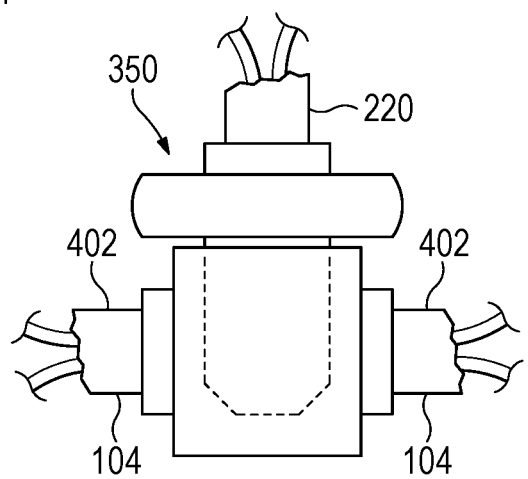
FIG. 4 is a cross-sectional diagram illustrating an example of a connector for electrical connection of a flame display unit to a flame display system control wire.

FIG. 4 shows more detail of one arrangement for connecting each flame display unit to the common wire 104. Each flame display unit may have a wire such as 220 connectable to the common wire 104, preferably in removable fashion, for example, using a connector assembly 350. In this way, individual flame display units may be added or removed from the system. The wire 104 is electrically continuous through the connector 350, so that it carries a signal regardless of the number of flame display units that may be connected or disconnected. A plug (not shown) may be used where a flame display unit is not connected to the assembly, in order to protect it from the elements. The wire 104 includes at least two conductors (as illustrated), but it may have more in various arrangements. In some cases, wire 104 may carry only a flame display analog control signal. In other examples, it may also carry a power supply signal such as a DC signal. In a different arrangement, illustrated in FIG. 6, the wire is used only for power; the control signal is broadcast wirelessly.

Figure 5A:
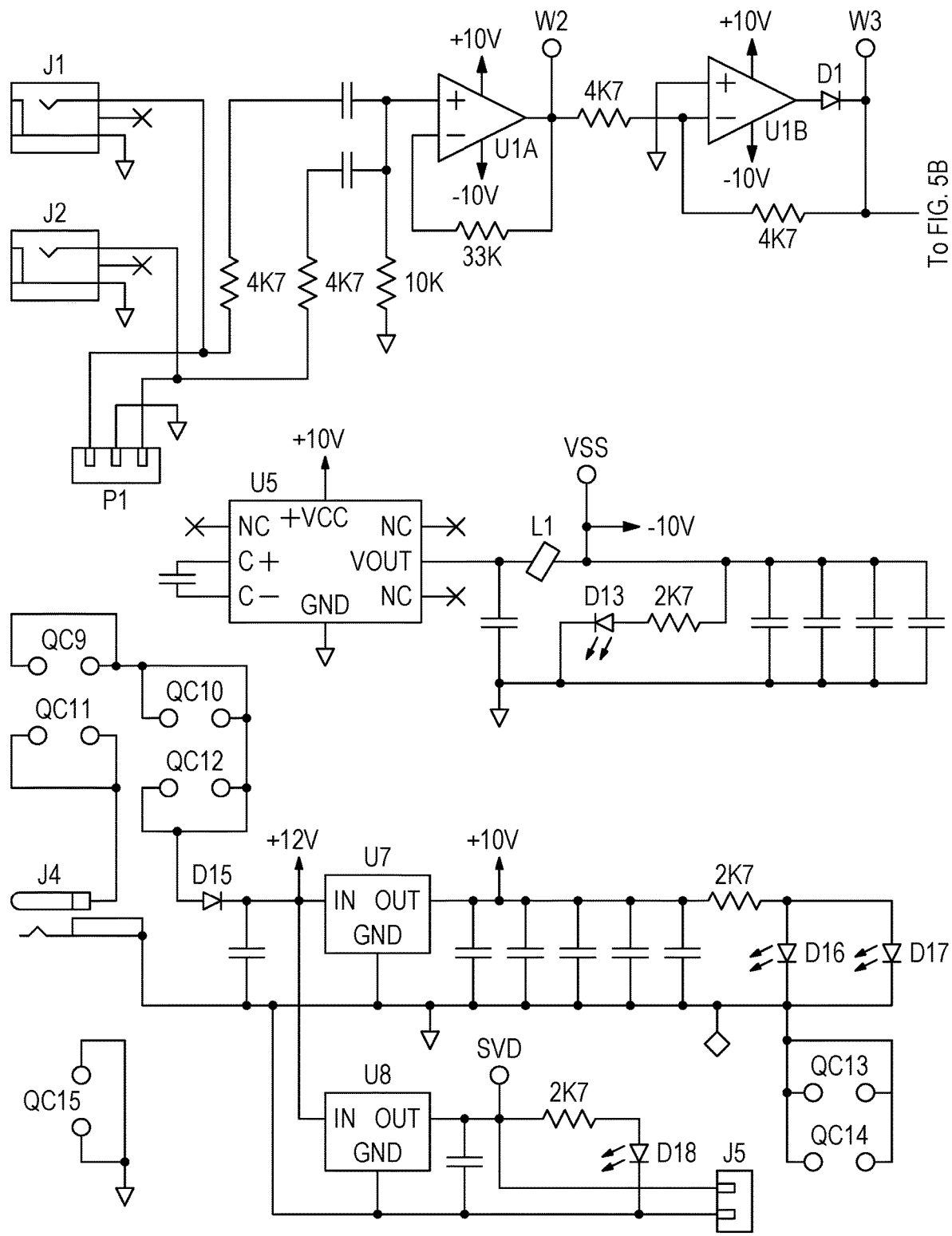
FIGS. 5A-5C together form a schematic diagram of an example base unit controller circuit for use in a flame display system of the type illustrated in FIG. 1.
Figure 5B:
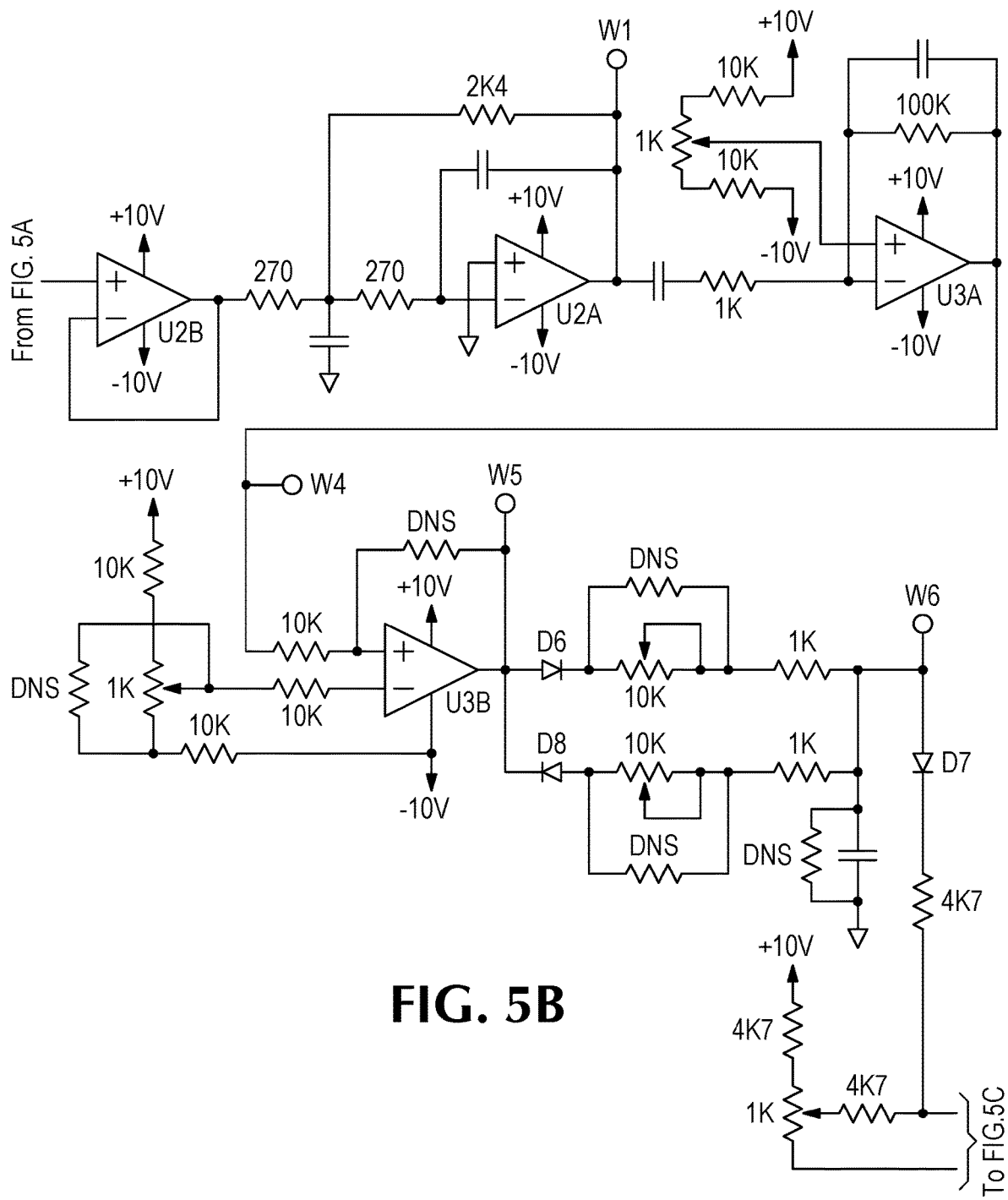
Figure 5C:
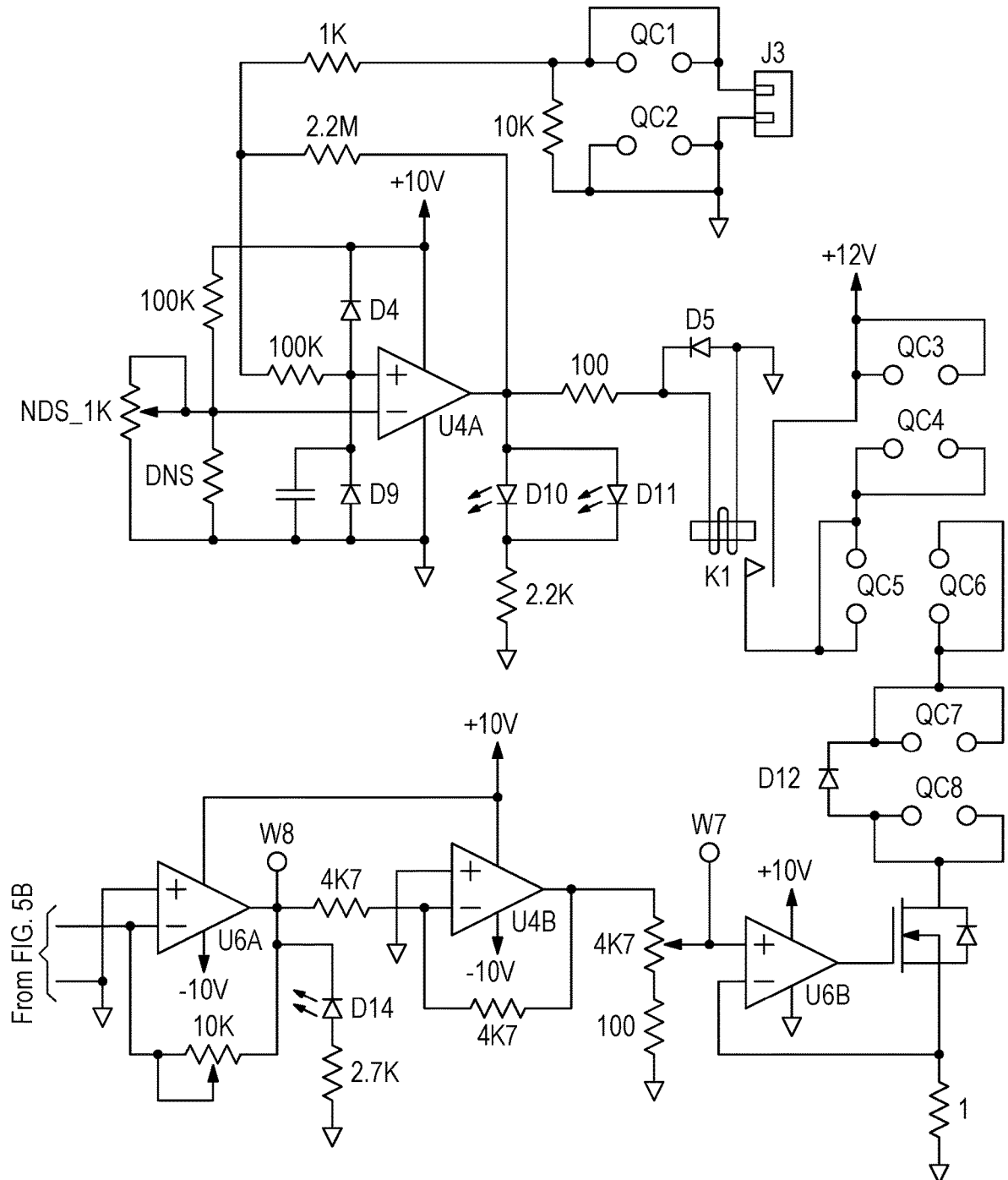

In the schematic diagram of FIGS. 5A-5C, a base unit controller circuit is intended to pulsate/adjust the height of a flame in one or more flame display units, responsive to a musical or other audio input. The controller circuit controls the flow of propane gas or other suitable fuel preferably using a high speed proportional valve to produce an active flame show. The circuit is designed to track the filtered outside envelope of the sound source. The flame height is changed by opening and closing of the gas valve. The system of FIG. 1 expands the control system to utilize multiple flame display units—all controlled by a single controller circuit as mentioned above with regard to FIGS. 1-4.

In more detail, for the controller circuit, a design approach was selected to produce a linear output analog valve position signal with a current feedback closed loop control. The design controls the valve current, not the valve voltage. The open/close action is based on the slope or rate of change of the envelope shape. The design therefore need not specifically extract or analyze the frequency content of the audio signal.

In some embodiments, the concept is to take the audio signal, full-wave rectify it, and low-pass filter the signal to limit changes to the response characteristics of the gas valve. The slope of the filtered signal is determined as positive (+/up) or negative (−/down). If up, the valve is opened; if down, the valve is closed. This up/down voltage may be combined with a DC offset voltage in a current summer circuit. This offset may be used to set the minimum valve drive current. Preferably, this signal both sets a pilot light function and puts the valve at its maximum drive range. The valve selected should have most of its flow capacity in the upper half of its operating current range. In one preferred embodiment, the valve may be Kelly Pneumatics, model number KPI-VPM-10-90-01, commercially available.

Preferably, the circuit design is completely analog, for example, using operational amplifiers; it does not contain any microprocessor or digital integrated circuits. The audio source connectivity may utilize a commercial Bluetooth radio/audio source module with outputs to the amplifier(s) come from the Bluetooth module. Alternatively, various audio content sources, wired or wireless, may be used. A "streaming" audio source may be used, for example, a computer, smartphone, tablet, etc. In other examples, audio source content may be stored locally and need not be streamed. Depending on the audio source, the audio signal may be scaled or otherwise modified.

In an embodiment, the input (supply) voltage may be, for example, 12-15 volts DC. Device outputs may be stereo channels left and right. There may be a flame detection cutoff circuit for safety interlock. Preferably, this is a hysteresis-based operational amplifier circuit for detecting thermocouple voltage outputs. There is a variable resistor to set the detection voltage depending on the type of thermocouple. Failure of the thermocouple flame detection will remove the control voltage from an internal relay which opens the valve drive circuit.

In an embodiment, the design has an internal settable control to provide a minimum drive current to the gas valve. This control is used to provide a minimum DC current to maintain a pilot light function to the fire. The same valve that controls the active flame is also the pilot light valve.

Referring to FIGS. 5A-5C, one example embodiment of a control circuit is shown. The specific components and their values are not intended to be critical or limiting of the general case; they merely show one embodiment. Referring first to FIG. 5A, at the left side, input jacks J1, J2 may be used for audio input signals, or a plug receptacle P1, for example, for Bluetooth audio wires. Operational amplifier AMP-1 provides AC amplifier DC isolation. AMP-2 implements a full-wave rectifier, details of which are well known. FIG. 5A also shows an internal power supply section, see U5, comprising a switched capacitor voltage converter to provide a (−) minus−10 v supply voltage. Voltage regulators U7, U8 and associated components also provide voltage supplies. At test point W3, the full-wave rectified signal is carried over to FIG. 5B.

Referring now to FIG. 5B, a low-pass filter circuit may comprise an op-amp U2A and associated passive components as illustrated. In one example, the op-amp may be an LM258 series IC or the like (an integrated pair of independent, high-gain, frequency-compensated operational amplifiers designed to operate from a single supply or split supply). The low-pass filter preferably may have a characteristic frequency of 500 Hz or thereabouts; the exact frequency is not critical. The frequency should be selected with regard to compatibility with the speed of the proportional valve.

A slope zero-offset summing circuit comprising RV1 offsets the signal voltage, which is then input to differentiator slope detector circuit comprising another op-amp U3A and associated components, producing the resulting signal at test point W4. In some embodiments, a slope offset circuit may be used if needed, as illustrated at the inverting input to op-amp U3B, comprising the resistor network around potentiometer RV4. The output of amplifier U3B (Test point W5) may be coupled to attack and decay adjusting circuits as illustrated, for example, to generate the signal at Test point W6, which in turn is coupled via D7 to the resistive network. Here the diagram continues on FIG. 5C.

Referring now to FIG. 5C, the signal pair from FIG. 5B is coupled to the inputs to amplifier circuit U6A and thence to U4B to set up valve current. Potentiometer RV7 may be arranged to setup valve current. The amplifier U6B is arranged to control a semiconductor device, such as a MOSFET IRFM120ATF in one example, which is a power MOSFET commercially available from Fairchild Instruments, now a part of ON Semiconductor. In this way, the analog signal output from amplifier U6B controls the current flow in the MOSFET which, in turn, controls current in a valve (not shown), having the valve coil connectable at QC7-QC8. As noted, the concept is to take the audio input signal (FIG. 5A), full wave rectify it, and low-pass filter the signal to limit changes to the response characteristics of the gas valve. The slope of the filtered signal is determined as positive (+/up) or negative (−/down). If up the valve is opened, if down the valve is closed. This up/down voltage is combined with a DC offset voltage in a current summer circuit. This offset is used to set the minimum valve drive current. This both sets a pilot light function and puts the valve in a maximum drive range. The valve may be selected to have most of its flow capacity in the upper half of its operating current range.

In some embodiments, the control circuitry of FIGS. 5A-5C may be deployed in a controller such as 102 in FIG. 1. For example, the analog control signal output from amplifier U6B may be coupled to multiple flame display units in a system such as illustrated in FIG. 1, where the analog control signal is distributed over wire 104. In such applications, each flame display unit 110 may receive the analog control signal via a corresponding connection 220. In each unit, referring to FIG. 3, the analog control signal is input to a local control circuit 320 to control the local valve, based on the control signal.

Figure 6:
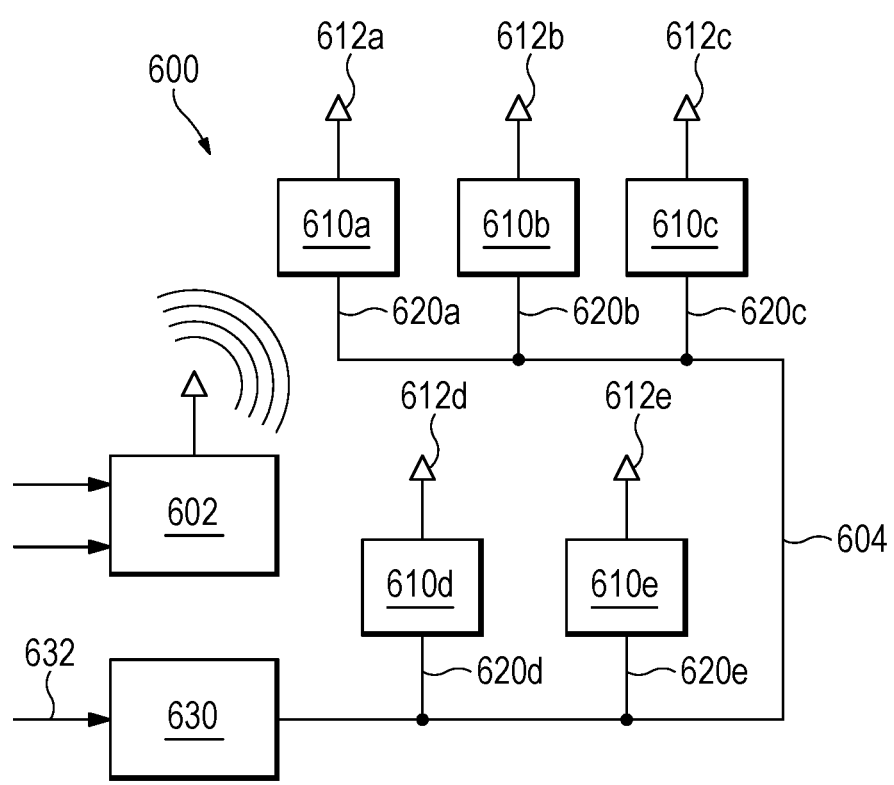
FIG. 6 is a simplified diagram of an alternative embodiment of an audio signal driven flame display system utilizing wireless broadcast of a control signal.

FIG. 6 illustrates a system 600 in which a base unit 602 is used to control plural flame display units 610. Each flame display unit 610 includes a corresponding antenna 612 to receive a wireless control signal broadcast by the base unit 602, using any of various known short-range wireless technologies. The wireless control signal encodes or carries the analog control signal to the flame display units where each one uses it to control the corresponding valve. In some embodiments, a low-voltage power supply 630 may be used to supply DC power to the flame display units via a wire 604.

Distributed Systems

The system of FIG. 1 shows a base unit 102 coupled to multiple flame display units 110*a*-110*e*. In this type of arrangement, the functionality of the control circuit of FIGS. 5A-5C may be partially "distributed" to the individual flame display units. Specifically, in an embodiment, an analog control signal may be generated based on the signal output at op-amp U6B in FIG. 5C. That is the signal that controls the gate of the MOSFET device. The MOSFET device and associated circuitry may be distributed in the sense that each flame display unit in the system has its own fuel valve, and circuitry to control the valve, such as a MOSFET.

An example is described above with regard to FIG. 3. In more detail, a (local) controller 320 disposed in each flame display unit receives an analog control signal from the base unit (via 220 and 104). The analog control signal is based on the signal output at op-amp U6B in FIG. 5C or a functionally equivalent signal. In various applications, signal voltages, currents, etc. may be arranged differently, as long as the analog signal conveys information for dynamic flame control responsive to the audio input signal at the base unit controller.

In some embodiments, a semiconductor circuit (not shown) may be arranged in the base unit to drive the analog control signal over the distribution wire 104. A high-gain circuit may be used (a Darlington, for example) for fast operation. On the receiving side, the flame display unit control circuit (320) is coupled to the wire 104 to receive the analog control signal. The control circuit may have a high-impedance input stage to receive the voltage without loading the common wire. An op-amp circuit may be used, for example, to then drive the gate of a MOSFET as illustrated in FIG. 5C. In some embodiments, other valve control circuitry shown in FIG. 5 may be provided instead in each individual flame display unit control circuit. Some examples are given in the description of FIG. 3. In general, flame control and safety circuitry may be disposed in each individual flame display unit. The role of the base unit may be limited to generating and distributing the analog control signal responsive to the audio input.

In other embodiments, a feedback signal may be generated by a flame display unit and sent to the base unit, for example a flame-out or low fuel alert.

The invention claimed is:

1. A system comprising:
a base unit including an analog base unit controller circuit arranged to receive an audio input signal and generate an analog control signal that is responsive to the audio input signal;
a control wire connectable to the base unit to distribute the analog control signal; and
a flame display unit electrically connectable to the control wire to receive the analog control signal;
the flame display unit including a combustible fuel source to generate an open flame;
and the flame display unit including a proportional valve to control flow of fuel from the fuel source so as to controllably vary a height of the open flame responsive to the analog control signal during operation of the flame display unit;
wherein:
the flame display unit includes a flame control circuit arranged to receive the analog control signal and generate an analog valve position signal; and
the flame control circuit is coupled to utilize the analog valve position signal to control electrical current in the proportional valve during operation, thereby producing an active flame show responsive to the audio input signal;
wherein:
the flame control circuit is arranged to present an impedance to the control wire while receiving the analog control signal, the impedance selected so as to enable operation of plural flame display units coupled to the control wire to provide multiple open flames varying synchronously during operation, all responsive to the analog control signal; and
wherein the analog base unit controller circuit includes:
an input section to receive the audio input signal;
a full-wave rectifier circuit coupled to the input section to rectify the audio input signal to form a rectified signal;
a low-pass filter circuit coupled to the full-wave rectifier circuit to filter the rectified signal to form in interim signal, the low-pass filter having a roll-off frequency selected based on response characteristics of the proportional valve; and
a current summing circuit to combine the interim signal with a predetermined DC offset voltage to form the analog control signal, for setting a minimum drive current in the proportional valve during operation.

2. A system comprising:
a base unit including an analog base unit controller circuit arranged to receive an audio input signal and generate an analog control signal that is responsive to the audio input signal;
a control wire connectable to the base unit to distribute the analog control signal; and
a flame display unit electrically connectable to the control wire to receive the analog control signal;
the flame display unit including a combustible fuel source to generate an open flame;
and the flame display unit including a proportional valve to control flow of fuel from the fuel source so as to controllably vary a height of the open flame responsive to the analog control circuit during operation of the flame display unit; wherein:
the flame display unit includes a flame control circuit arranged to receive the analog control signal and generate an analog valve position signal;
the flame control circuit is coupled to utilize the analog valve position signal to control electrical current in the proportional valve during operation, thereby producing an active flame show responsive to the audio input signal;
the flame control circuit is arranged to present an impedance to the control wire while receiving the analog control signal, the impedance selected so as to enable operation of plural flame display units coupled to the control wire to provide multiple open flames varying synchronously during operation, all responsive to the analog control signal; and
wherein the flame control circuit includes a current feedback closed loop control circuit for controlling the proportional valve current.

3. A system comprising:
a base unit including an analog base unit controller circuit arranged to receive an audio input signal and generate an analog control signal that is responsive to the audio input signal;
a wireless transmitter arranged to transmit a wireless control signal based on the analog control signal; and a flame display unit including a receiver to receive the wireless control signal and recover the analog control signal from the wireless control signal;

the flame display unit including a combustible fuel source to generate an open flame;

and the flame display unit including a proportional valve arranged to control flow of fuel from the fuel source so as to controllably vary a height of the open flame responsive to the analog control signal during operation of the flame display unit; wherein the flame display unit includes a flame control circuit arranged to receive the analog control signal from the receiver and generate an analog valve position signal; wherein the flame control circuit is coupled to utilize the analog valve position signal to control electrical current in the proportional valve during operation, thereby producing an active flame show responsive to the audio input signal; and the flame display unit has an appearance that resembles a tiki torch.

4. A method comprising:

providing a valve for controlling a flow of fuel to a burner, wherein the valve has a position (open/closed) state that is substantially proportional to an applied current;

receiving an audio input signal;

rectifying the input signal to form a second signal;

in an analog circuit, low pass filtering the second signal to form an envelope signal;

in the analog circuit, generating a slope voltage (+ or −) signal responsive to the envelope signal;

in the analog circuit, generating a control current responsive to the slope voltage;

in the analog circuit, generating a valve current based at least in part on the control current; and applying the valve current to the valve as the applied current, to control the flow of fuel to the burner responsive to the audio input signal.

5. The method of claim 4 and further comprising:

distributing an analog control signal to a remote flame display unit to control a valve in the remote flame display unit responsive to the audio input signal.

6. The method of claim 5 and wherein the analog control signal comprises a voltage proportional to the valve current.

7. The method of claim 5 including distributing the analog control signal wirelessly to multiple remote flame display units to operate them synchronously.

8. The method of claim 5 wherein the flame display unit has an appearance that resembles a tiki torch.

9. The system of claim 2 wherein the flame control circuit includes a power MOSFET semiconductor device coupled to the proportional valve to control valve current responsive to the analog control signal.

* * * * *